(12) United States Patent
Vernyi et al.

(10) Patent No.: US 11,851,153 B2
(45) Date of Patent: Dec. 26, 2023

(54) SYSTEMS AND METHODS FOR MEASURING LIFT OF A GAS CELL

(71) Applicant: LTA Research and Exploration, LLC, Sunnyvale, CA (US)

(72) Inventors: Kyle Vernyi, Akron, OH (US); Dennis L Carter, Hudson, OH (US); Jonathan Wittmer, Austin, TX (US)

(73) Assignee: LTA Research and Exploration, LLC, Sunnyvale, CA (US)

( * ) Notice: Subject to any disclaimer, the term of this patent is extended or adjusted under 35 U.S.C. 154(b) by 109 days.

(21) Appl. No.: 17/499,504

(22) Filed: Oct. 12, 2021

(65) Prior Publication Data

US 2023/0111851 A1    Apr. 13, 2023

(51) Int. Cl.
| | |
|---|---|
| *B64B 1/06* | (2006.01) |
| *G01B 11/22* | (2006.01) |
| *B64B 1/62* | (2006.01) |
| *B64B 1/60* | (2006.01) |
| *G01F 17/00* | (2006.01) |
| *G01B 11/24* | (2006.01) |
| *G01B 5/00* | (2006.01) |

(52) U.S. Cl.
CPC .................. *B64B 1/06* (2013.01); *B64B 1/60* (2013.01); *B64B 1/62* (2013.01); *G01B 5/0021* (2013.01); *G01B 11/22* (2013.01); *G01B 11/24* (2013.01); *G01F 17/00* (2013.01)

(58) Field of Classification Search
CPC .... B64B 1/06; B64B 1/62; B64B 1/60; G01B 11/22; G01B 5/0021; G01B 11/24; G01F 17/00

USPC ............................................. 73/149; 244/30
See application file for complete search history.

(56) References Cited

U.S. PATENT DOCUMENTS

| | | | |
|---|---|---|---|
| 2,342,587 A | 2/1944 | Klemperer | |
| 9,573,670 B2 * | 2/2017 | Roach | ........................ B64B 1/40 |
| 2008/0011900 A1 * | 1/2008 | Quintana | .................. B64B 1/30 |
| | | | 244/30 |

(Continued)

FOREIGN PATENT DOCUMENTS

| | | | | |
|---|---|---|---|---|
| CN | 203601556 U | * | 5/2014 | |
| WO | WO-2008108655 A1 | * | 9/2008 | ............... B64B 1/60 |

OTHER PUBLICATIONS

Kazhdanl, et al., Poisson Surface Reconstruction, Eurographics Symposium on Geometry Processing, 10 pages, 2006.

(Continued)

*Primary Examiner* — Mischita L Henson
*Assistant Examiner* — Monica S Young
(74) *Attorney, Agent, or Firm* — Baker Botts L.L.P.

(57) ABSTRACT

The disclosed invention describes a method for determining a current state of a gas cell in an airship, particularly the lift. A computing device receives depth measurements of the interior of the gas cell using a lidar sensor positioned outside the cell and uses these depth measurements to create a mesh, segment a space within the mesh into geometric shapes, calculate the volume of the shapes, and use the calculated volume to estimate the total volume of the space within the mesh, representing the volume of gas within the gas cell. The computing device then uses the estimated volume to calculate the lift of the gas cell and sends the calculated lift to a control module of the airship.

20 Claims, 13 Drawing Sheets

(56) References Cited

U.S. PATENT DOCUMENTS

| | | | | |
|---|---|---|---|---|
| 2009/0152391 A1* | 6/2009 | McWhirk | ............. | B64B 1/70 244/30 |
| 2013/0035894 A1* | 2/2013 | Greiner | ............. | G01F 17/00 702/150 |
| 2020/0191821 A1* | 6/2020 | Rondeau | ............. | G01P 5/26 |
| 2020/0331581 A1* | 10/2020 | Walker | ............. | B64B 1/62 |
| 2021/0310845 A1* | 10/2021 | Mendez | ............. | G01F 1/05 |
| 2021/0347460 A1* | 11/2021 | Watters | ............. | G05D 1/104 |
| 2022/0227469 A1* | 7/2022 | Durham | ............. | B64B 1/40 |

OTHER PUBLICATIONS

Underwood, et al., Mapping almond orchard canopy volume, flowers, fruit and yield using lidar and Vision sensors, Computers and Electronics in Agriculture, 130:83-96, 2016 Elsevier, 14 pages, Oct. 28, 2016.

* cited by examiner

SYSTEMS AND METHODS FOR MEASURING LIFT OF A GAS CELL

TECHNICAL FIELD

This disclosure generally relates to airships or lighter-than-air aircrafts, and more particularly to methods and systems to calculate the volume of lifting gas within their gas cells and the associated lift.

BACKGROUND

Airships are lighter-than-air aircrafts that obtain the necessary lift for flight based on buoyancy generated by gas that is less dense than the surrounding air. Airship hulls are typically divided into a lifting gas compartment or compartments, and an air compartment or compartments. In a rigid airship, the lifting gas compartments are referred to as gas cells. These gas cells are filled with a lighter-than-air lifting gas such as helium or hydrogen in order to provide a buoyancy force on the airship. The buoyancy force is also known as static lift. The static lift of an airship is the single most important aerostatic force acting on the airship and it largely defines its gross weight capability. The static lift, or lift, associated with gas cells must remain above a certain threshold for an airship to remain in the air.

Gas cells are typically fabric structures that are flexible enough to accommodate internal gas volumes from zero to completely full. The gas volumes may fluctuate, particularly during flight. It is important for the pilot and the flight control system of the airship to be able to accurately compute lift mid-flight to control the airship. If the real-time volume of the cell is known, the static lift can be calculated, and from that the contribution of each cell to the overall static lift as well as static pitch may be calculated. The center of buoyancy for each cell can also be calculated, which is similarly helpful for the pilot and the flight control system.

SUMMARY OF PARTICULAR EMBODIMENTS

Embodiments disclosed herein pertain to methods and systems for determining a current state of a gas cell of an airship. In particular embodiments, one or more lidar sensors are positioned to measure coordinates of fabric boundaries of the gas cell from inside the cell. In an embodiment, a lidar sensor is positioned outside the gas cell and pointing towards the interior surface of the gas cell through a transparent window of the gas cell. From the outside position pointing inward, the lidar sensor can be used to obtain depth measurements of an interior surface of the gas cell. In an embodiment, the depth measurements are transmitted to and received by a computing device associated with the airship. The transmission may be, for example, through a wire connecting the sensor to the computing device. Alternatively, the connection may be wireless, such as when an airship is controlled through a flight controller on the ground.

In an embodiment, a computing device is programmed to, when it receives depth measurements, create a mesh representing the interior surface of a gas cell. In some embodiments, the computing device may be programmed to further segment a space within the mesh into a plurality of three-dimensional geometric shapes. The geometric shapes may be triangles, or they may be squares or octagons. In an embodiment, the computing device may be programmed to calculate a volume of each of the plurality of three-dimensional shapes and use the calculated volume of the three-dimensional shapes to estimate a total volume of space within the mesh.

In some embodiments, a computing device is programmed to determine a lift of a gas cell by performing calculations using a total volume of space within a mesh, such as may have been determined using the prior steps, and a unit lift for the specific lifting gas being used, such as helium or hydrogen. The lift of the gas cell may be computed based on a lift of a gas in the cell, which gas may be lighter than air in the atmosphere. The computing device may be programmed to send the lift of the gas cell to a control module of the airship, which control module may cause the lift to be displayed to a control operator or pilot or used to cause some action. Some embodiments involve programming a control module to constantly monitor the lift in an airship while the airship is in flight, thereby enhancing safety and performance.

In an embodiment, a gas cell may be one of a plurality of gas cells in the airship. A computing device associated with the airship may be programmed to take a lift measurement for each of the plurality of gas cells and sum them together to get a lift for the entire airship.

In an embodiment, a computing device may be programmed to cause a calculated lift to be displayed on a control module and/or to cause an alert to sound to the control module when the lift of the gas cell has fallen below a predetermined threshold, which threshold in some instances may be 80%. Alternatively or in addition to this, a computing device may be programmed to calculate lift over time to establish, and in some instances display, a ship's overall leak-rate.

In an embodiment, a computing device may be programmed to calculate a center of buoyancy for a gas cell using methods similar to those used to generate a total volume of space within a generated mesh. The method is similar in that the strategic setup of the lidar system used to improve the accuracy of volume measurements can also be used to determine the contours of the shape of the cell, or its coordinates, which are necessary obtain an accurate measurement for center of buoyancy. Additionally or in the alternative, the computing device may be programmed to calculate a static lift of the gas cell by multiplying the total volume of the space within the mesh by a unit lift of a gas inside the gas cell.

In further embodiments, a lidar sensor may be placed at the top of the gas cell. In a further embodiment, a second lidar sensor may be placed at a second location on or in the gas cell, which second location may be, for example, at the bottom or on a side. The second lidar sensor may generate depth measurements and send them to a computing device to create a mesh.

In some embodiments, a computing device may be programmed to add an unscanned volume to a total volume of the space within a generated mesh. The unscanned volume may be a volume of a gas cell that is out of a line of sight of the one or more lidar sensors. The unscanned volume may be assumed to be at full volume since the rising of the gas causes the top portion of the gas cell to remain full longer than other parts of the gas cell. In an embodiment, the unscanned volume is calculated from a CAD model of the gas cell.

The embodiments disclosed herein are only examples, and the scope of this disclosure is not limited to them. Particular embodiments may include all, some, or none of the components, elements, features, functions, operations, or steps of the embodiments disclosed above. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Overview

The current disclosure presents a direct method to calculate lift with high accuracy and repeatability of gas cells in blimps, semi-rigid airships, and rigid airships. In this disclosure, these will all collectively be referred to as airships. This method involves strategic placement of measuring equipment and careful calculations by a computing device connected to a control system of an airship.

Structure of Airship

Figure 1:
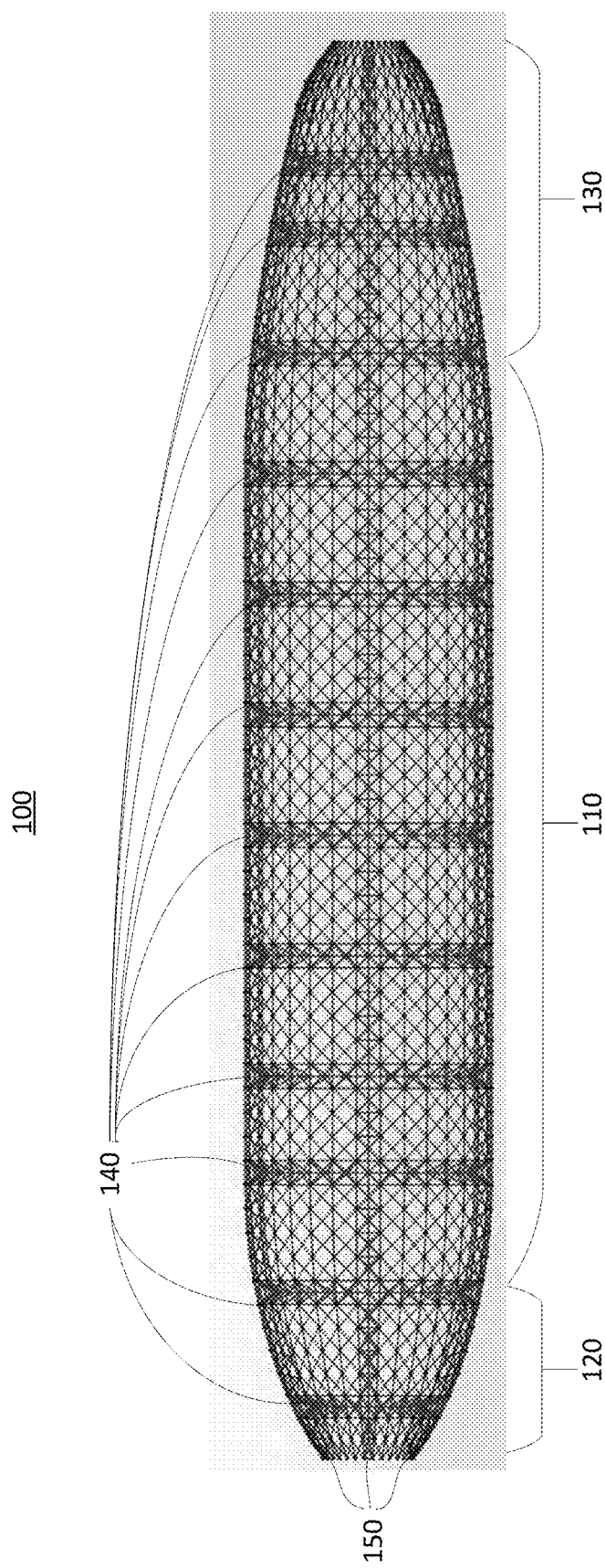
FIG. 1 illustrates an example structure of a rigid airship.

Particular embodiments described herein generally relate to using a computing device to automatically calculate the lift for a gas cell in a rigid or semi-rigid airship. FIG. 1 illustrates an example structure 100 of a rigid airship. The structure 100 may comprise a hull section 110, a bow section 120, and a stern section 130 to which the airship's rudder may be attached. The structure 100 may comprise multiple main traverse frames or mainframes 140. In particular embodiments, each mainframe 140 is circular. In particular embodiments, the mainframes 140 may be interconnected using longitudinal gangways 150. In particular embodiments, wires (e.g., which may be constructed using Vectran fiber or any other suitable material with suitable strength and flexibility characteristics) connecting points on the inner circumference of each mainframe 140 may physically section the hull 110 into multiple segments. The segments may be used to hold individual gas cells containing lifting gas, such as helium.

Overview of the Disclosed Method

Figure 2:
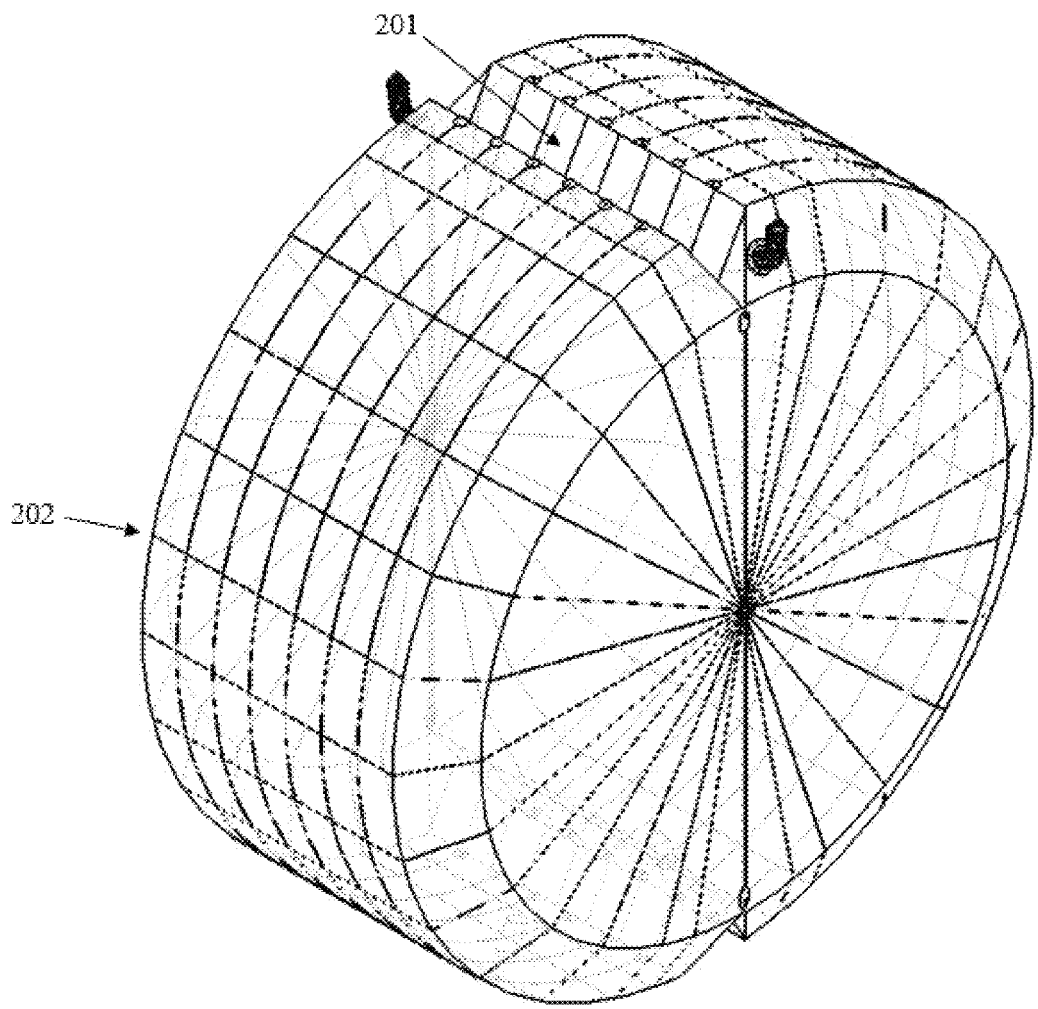
FIG. 2 illustrates an example structure of a wireframe of a gas cell, from an isometric view.
Figure 3:
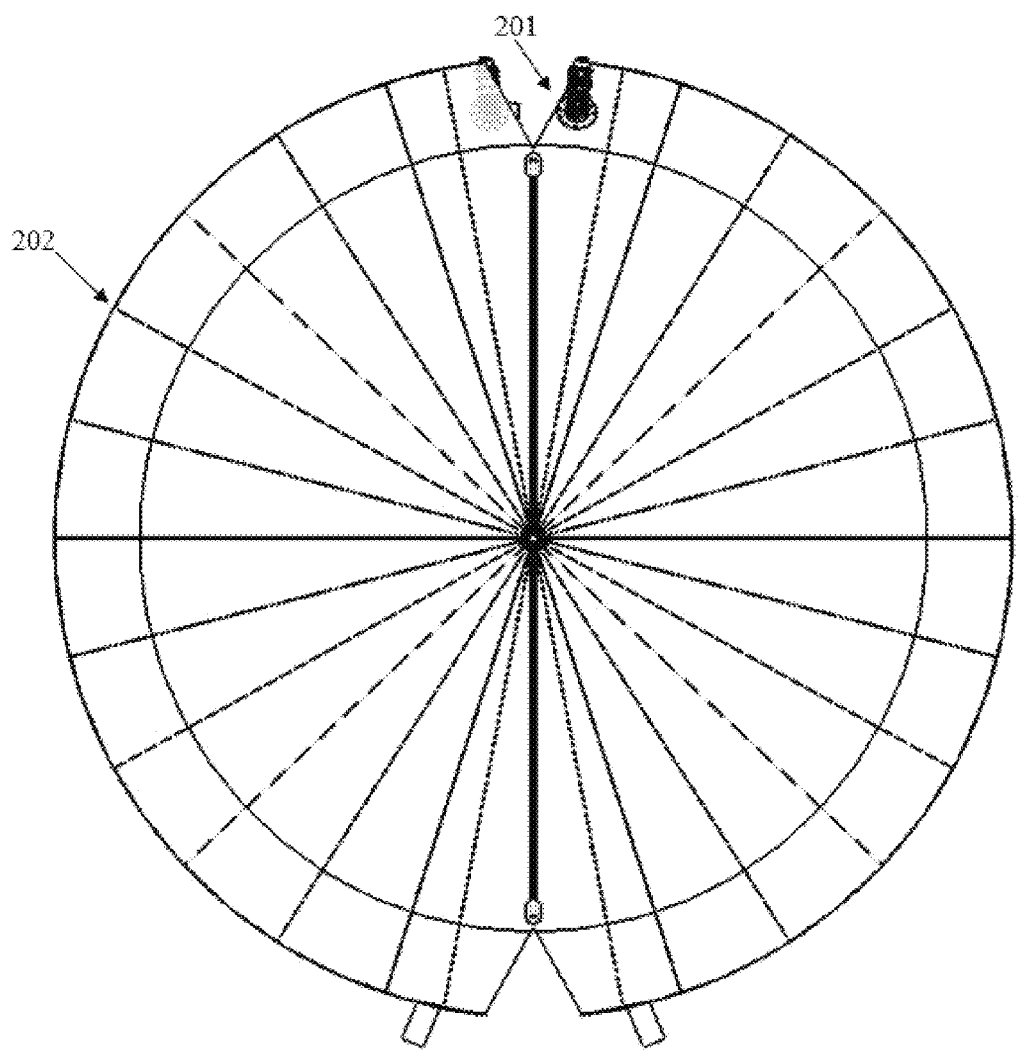
FIG. 3 illustrates an example structure of a wireframe of a gas cell, from a front view.

In certain embodiments, a lift and/or center of buoyancy for a gas cell is calculated using a computing device. The computing device is programmed to execute instructions to calculate the lift where the program begins by first receiving as input or calculating a volume. While a gas cell maintains a basic structure using a wireframe, the total volume of gas within a cell may shift constantly through effects of altitude and lifting gas leaks. These subtle changes in volume are difficult to quantify, a difficulty this disclosure remedies. FIG. 2 illustrates an example structure of wireframe of a gas cell, from an isometric view. FIG. 3 illustrates an example structure of a wireframe of a gas cell, from a front view. This may be how a gas cell looks when it is fully inflated. The gas cell may fit into portions of the airship. There may be multiple gas cells within a single airship. The computing device may calculate the lift for all the gas cells within the airship. In some embodiments, the top 201 of a gas cell is the location where a sensor is mounted, which sensor may be a lidar sensor. While one or more sensors may be placed at any other portion of the cell, the top 201 of the cell has the advantage of any portions of the cell that the sensor cannot detect being the last portion of the cell to become deformed, the full benefits of this being more fully described later in this disclosure. The inner boundaries of the fabric of the cell 202 can be scanned to detect deformities in the shape of the cell caused by deflation. The outer fabric of the cell may be in contact with other cells in an airship or an outer portion of an airship.

A computing device may be programmed to calculate the static lift of helium in a gas cell if an accurate measure of the cell volume can be calculated and the unit lift of helium is known. The unit lift of helium is dependent on the helium purity, atmospheric and helium pressures, temperatures, and humidities. A longstanding barrier to obtaining accurate in-flight static lift measurements is the difficulty of gathering the necessary information and performing the calculations required to obtain a precise volume of a gas cell.

Current methods of calculating a volume of a gas cell are insufficient as they are indirect and provide low accuracy. For example, one current method of calculating lift is an indirect method using pressure, temperature, and an estimation of cell height. This method requires knowing the entire state of the gas inside the cell at one instant. This forces the airship to take many different types of measurements, requiring bulky and expensive equipment, and results in only a rough estimate for net lift. This method is insufficient because it does not measure actual volume and the calculations are not accurate or reliable.

Another common method, used in some blimps and small semi-rigid airships, involves providing a clear window between cockpit and the gas cells. The pilot may look at and estimate the bottom level of the gas cell and use this to estimate the amount of lift. This method can result in significant errors since it is based on pilot judgement of fullness. In addition, this method may be particularly unpractical for a large airship, which may hold several gas cells.

In an embodiment, this disclosure provides a more accurate and automated method of gathering data and using the data to calculate volume for a gas cell, which can then be used to obtain important measures for flight such as lift and center of buoyancy. In some embodiments, a sensor, such as a lidar sensor, may be used to gather depth measurements. A computing device may be programmed to represent the gathered depth measurements as point cloud data. The computing device may further be programmed to run a series of algorithms to generate a close estimate of volume of the gas cell. From there, the computing device may be programmed with instructions to execute calculations for center of buoyancy and lift and send the measures of the center of buoyancy and lift to a control module. The control module may be connected to a ground station or entirely self-contained in the airship. The control module may then execute actions in response to the measures of the center of buoyancy and lift and a set of pre-programmed instructions, such as, for example, engaging propellers or adjusting fins. The steps of this method will be explained in more detail below.

Data Gathering

In an embodiment, a method of accurately calculating lift and/or center of buoyancy of a gas cell begins by strategically placing sensors to gather appropriate data points for volume calculations. Given the shifting nature of gas cells due to pressure and temperature differentials as a gas cell rises and falls in the atmosphere, proper selection and placement of a measuring device could significantly impact the ability of the measuring device to observe the interior of the gas cell. For example, the volume and boundaries of a gas cell may continuously change as the atmosphere exerts pressure on the cell making conventional methods of data gathering for volume calculations for fluid containers, many of which containers have unchanging boundaries, inadequate.

Lidar Sensor

In an embodiment, to gather data to be used to calculate the volume of a gas cell, a method places one or more sensors on the gas cell such that they can be used to measure coordinate points at various locations on the inner boundaries, which may be made of fabric, of the gas cell. This may be done by placing the sensors within the cell or on the outside of the cell with a window to allow interior depth measurements to be taken.

In an embodiment, a lidar sensor is strategically positioned and used to collect point cloud data that can be input to a computing device within or connected to an airship and used to calculate lift and/or center of buoyancy, which the computing device can then display to a pilot or flight control operator of the airship or otherwise use to perform pre-programmed actions. In an embodiment, the data that is programmed to be collected by the computing device is a 3D point cloud that can store XYZI points, where "I" represents intensity. Point clouds are data structures that store large amounts of location data. To collect these points, an embodiment of this method may use, for example, a ROBOSENSE 3D LIDAR unit called the RS-BPEARL, which is low weight and has a low power requirement. In an embodiment, the lidar sensor used may have a 360-degree horizontal (azimuth) FOV and 90-degree vertical (elevation) FOV.

In an embodiment, the lidar sensor is positioned on top of the gas cell. When the gas cell starts to deflate, such as during flight, the bottom portion of the cell is impacted first, and the contours of the cell may become distorted. If the lidar were to be mounted in the distorted region, the field of view of the lidar would no longer be optimal (e.g., if the distortion causes the lidar to point toward the right, the lidar may only be able to measure an unknown percentage of the gas cell). Since the gas in the gas cell is lighter than the surrounding air, it naturally rises to the top of the cell. Since the gas rises to the top of the cell, the top of the gas cell remains inflated even when gas leaks out. This means that the top of the gas cell is more stable and is the optimal location to mount the lidar.

In an embodiment, a sensor used to collect data may rotate at 600/1200 rpm or 10/20 Hz operating frequency. In an embodiment, a computing device may be programmed to operate the sensor at 10 Hz. This may give the sensor greater accuracy and is a viable option since the ship's main control loop often runs at a much lower frequency, and thus does not itself necessitate the sensor running at a high frequency. In some instances, a manufacturer of the sensor may list the resolution to be 50% finer while operating at a lower speed (600 rpm). The sensor may be able to take more time in collecting data and the motor may be controlled more precisely while operating at the lower speed. In an embodiment, each scan may provide 57,600 points. In an embodiment, the computing device may be programmed to execute an algorithm for computing the volume and lift of the gas cell based on the measured point cloud. The details of algorithms used by the computing device will be given in more detail later in this disclosure.

In an embodiment, lidar equipment may have a 35-degree vertical range and 180-degree horizontal range. In a particular embodiment, the horizontal range may be 270 degrees. In an embodiment, the equipment would be robust enough to handle gas cell material that has a low light-reflectivity and have a minimum range of 30-40 meters (984-1312 feet). The lidar may measure laser returns. When this is the case, the material that the laser hits must be reflective enough so that the laser is returned rather than being entirely absorbed.

Figure 4:
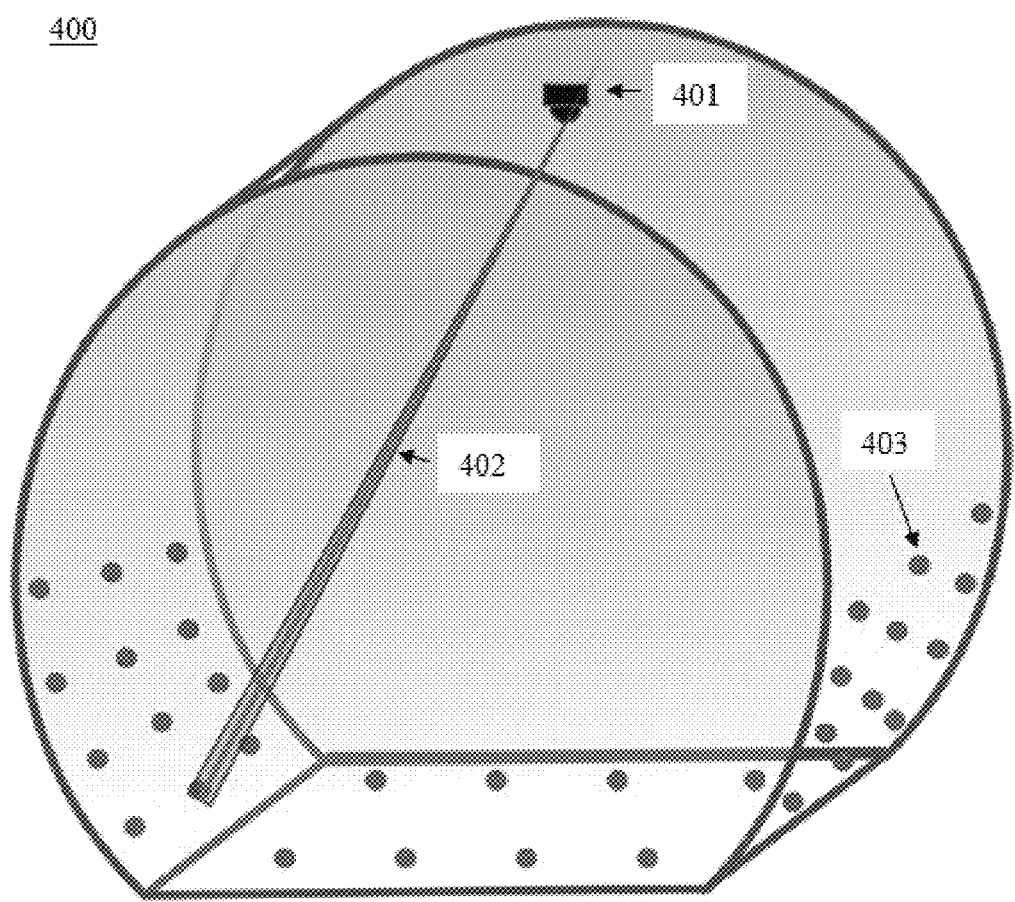
FIG. 4 illustrates an example of a setup of a sensor within a gas cell.

FIG. 4 illustrates an example of a setup of a sensor within or connected to a gas cell 400. In some embodiments, a sensor 401 (e.g., a lidar or camera setup for measuring depth) may be at the top of the gas cell 400. The top of the gas cell 400 may be the highest point when the gas cell 400 is fully inflated. In some embodiments, particularly when the shape of the cell 400 is flat such that the highest point of the gas cell covers a large surface area, the sensor 401 may be centered to allow for the most even coverage of the sides of the gas cell 400. For clarity, the sensor 401 is shown in FIG. 4 as though it is placed on the inside of the gas cell 400, which may be the case for some embodiments, but in other embodiments the sensor 401 may be on the outside of the gas cell 400, positioned such that the sensor 401 is capable of detecting points on the inside of the cell 400 and obtaining interior depth measurements. The sensor 401 may have a 180-degree field of view. In some embodiments, the bottom of the sensor 401 may be mounted to the roof of the gas cell 400 so that the hemispheric field of view points downward.

In particular embodiments where the sensor 401 is placed outside of the gas cell, the sensor 401 may be placed on top of a window that opens into the cell. This window may be, for example, a portion of fabric made of transparent material which portion of fabric connects with the remaining fabric of the gas cell or a hard transparent material, such as polycarbonate (or any clear aerospace grade polymer that will not distort light), which connects with the remaining fabric of the gas cell 400. Whichever transparent material is used to create the window, the effect is to create an opening that allows light to enter the cell without creating an opening for gas to escape. The sensor 401 may be pointed downwards so that its field of view can capture the interior of the gas cell 400 through the window. In some embodiments, the sensor 401 is a lidar sensor. Lidar may work by emitting pulsed light waves 402 at various points 403 in the cell 400. These pulses reflect off the fabric of the cell and return to the sensor. The time-of-flight of the reflected laser is used to measure the depth of each point 403 intersected by the laser. In other embodiments, the sensor 401 could be a pair of stereo cameras or any other suitable types of sensors capable of performing depth measurements, such as laser distance and radar sensors. In some embodiments, a computing device is programmed to calculate the distance the pulse light waves traveled using the amount of time it took for the pulse light wave to return to the sensor after being emitted. In some embodiments, the computing device is programmed to translate the distance the pulse light waves traveled to determine depth measurements at different locations within the cell. The depth measurements may be represented as 3D coordinates. The computing device programmed to calculate the distance the pulse light waves traveled may be different than the computing device used to perform the rest of the calculations and controls and may be located inside the sensor itself.

Point Cloud

A computing device may be programmed to execute instructions to transform raw data collected by the sensor into depth measurements, 3D coordinates, and a point cloud representing the 3D coordinates. A preset function may be used to create a point cloud from the data. This manipulation of the data makes it possible for the computing device to further execute instructions to perform calculations to determine a close estimate of volume for gas within a gas cell.

For example, tens of thousands of points may be taken for a particular point cloud. In some embodiments, the number of points taken may be 70,000. A sensor may be located at a top center portion. An upper portion may be out of range of detection by the sensor. Since the rising of the lifting gas causes this portion to be the last portion of the gas cell to become deformed, it can be assumed that this upper portion is full. As previously described, the volume of this upper portion may be calculated using a CAD model and entered into an onboard computing device prior to flight to be added after other volume measurements are done. The sensor detects points, often tens of thousands of them, which, in some embodiments, are entered as inputs to a program with instructions to execute a function to create a point cloud. The point cloud may be created by accumulating the points detected by the sensor in one image. In some embodiments, the accumulation is performed by a computing device dedicated to the sensor. In others, the accumulation is performed by an external computing device or a computing device associated with an airship, either onboard the airship or on the ground but connected to the airship.

In an embodiment, after the coordinate points are measured, the information is input to a computing device to be stored in a data structure called a point cloud. Each entry inside the point cloud is an XYZ point in space. Each point has a common origin point, which allows the points to be used together in calculations.

Calculations

In some embodiments, a computing device may be programmed to estimate the volume of lifting gas within a gas cell, using as input gathered point cloud data. The estimated volume may then be used to calculate the lift for a gas cell and/or data collected using the same lidar setup may be used to calculate the center of buoyancy for a gas cell.

Volume: Mesh Method

One way of finding or approximating a volume of a convex object, such as a gas cell is to approximate the shape of the object with triangles, form tetrahedrons, and sum the volume of those tetrahedrons. In some embodiments, a computing device in this invention forms a triangulated surface (e.g., a 3D mesh) that wraps an entire image of a gas cell, viewed as a point cloud. In an embodiment, the computing device is programmed to execute a set of instructions in order to perform a mathematical process that forms the triangulated surface called Poisson Surface Reconstruction (PSR). This process may create a smooth, closed, triangular surface over the previously-discussed point cloud. This process will be discussed in more detail below.

Algorithm for Mesh Method

In some embodiments, the computing device may be programmed to execute a set of instructions to estimate a volume for a gas cell which can be used to calculate a lift. Data gathered by a lidar system may similarly be used to calculate a center of buoyancy. One example of this set of instructions is represented in the operational pipeline illustrated in Table 1.

Figure 5:
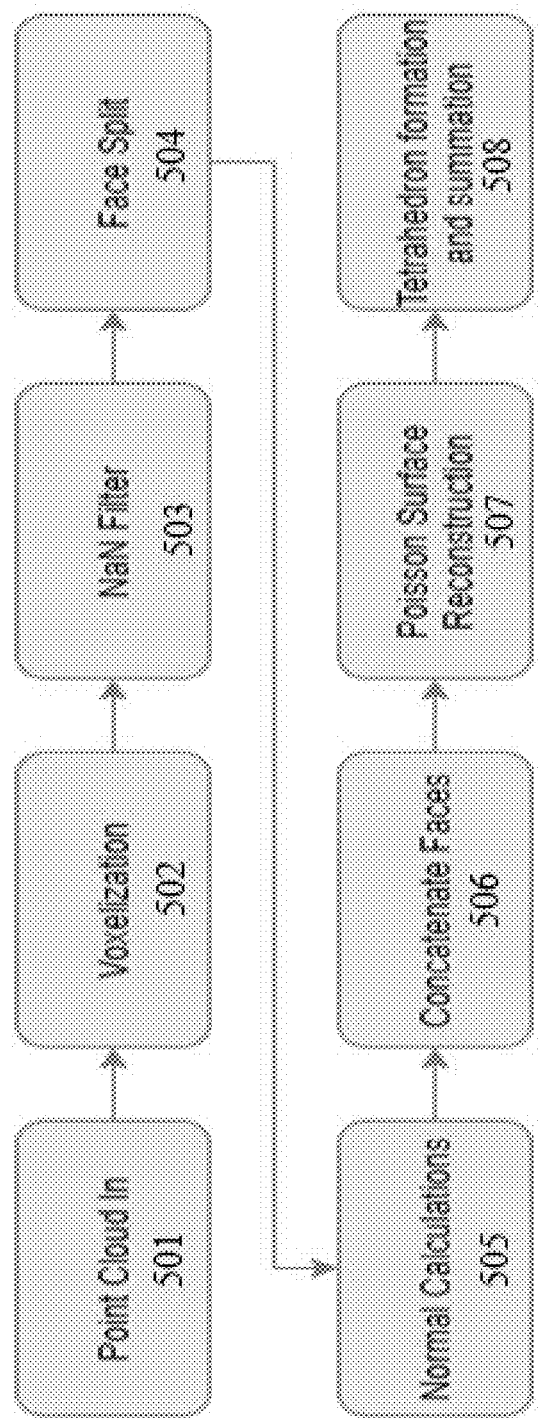
FIG. 5 illustrates an operational pipeline.

FIG. 5 illustrates an operational pipeline. In an embodiment, after Step 501 where point cloud data is collected by the lidar unit or other sensor and input to a computing device. Next, in Step 502, the point cloud is voxelized through instructions executed by the computing device. Essentially, this operation involves averaging and downsampling points in 3D space. This reduces computation time, makes the cloud more grid-like, and helps reduce any randomness error from a sensor. Then, in Step 503, any data points returned from the sensor as Not a Number (NaN) are removed from the point cloud using a NaN filter. These may be removed at this point because previous filters could safely handle these NaNs, and it takes less time to search the cloud for NaN if the cloud is smaller.

In some embodiments, in Step 504, the next operation executed by a computing device is a face split. An inflated cell may be approximately the shape of a cylinder. A face split is a passthrough filter that splits the circular faces and rectangular face of the cylinder into two separate clouds. It groups the point clouds based on their x distance from the origin. This is why the point cloud, in some embodiments, may be rotated to be square with the axis. In an embodiment, if a point is a certain x distance from the origin, it is put into the circular face group. This increases the accuracy of a normal calculation in Step 505. The normal calculation uses a local neighborhood search which is sized on a given radius. A local plane for each neighborhood is calculated before a normal to the plane is calculated. Since a gas cell is not a flat plane, some methods of calculating the normal to the plane will result in inaccurate methods at corner regions. To fix this problem, in some embodiments, the computing device may be programmed to split the point cloud so the points do not interfere with each other during the search. In some embodiments, the normal are then made accurate. In Step 506, the computing device may be programmed to concatenate faces, meaning that it recombines the two clouds that resulted from the faces split filter. The data is unchanged in this process, but the points are then recombined back into one cloud.

Figure 6:
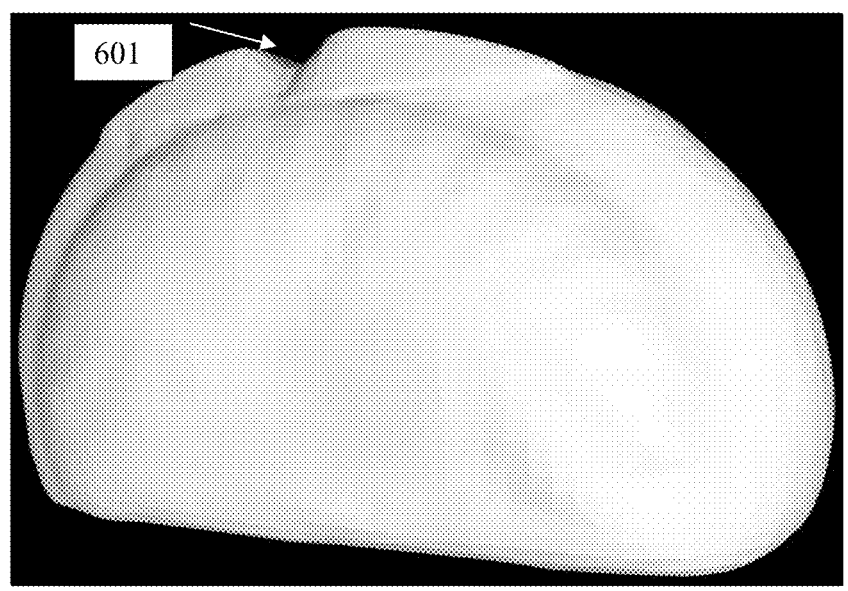
FIG. 6 illustrates a visualization of Poisson Surface Reconstruction with approximately 28,000 triangles.

In an embodiment, in Step 507, a computing device is programmed to then execute instructions to run a Poisson Surface Reconstruction (PSR) method and create a PSR mesh. FIG. 6 illustrates a visualization of Poisson Surface Reconstruction with approximately 28,000 triangles. A top location 601 may be where the sensor is placed for reasons previously discussed. Finally, at Step 508, tetrahedrons are formed and summed to provide a total volume of the gas within a cell.

In other embodiments, extra steps are added to those shown in FIG. 5. For example, after the point cloud data is collected in Step 501, the point cloud may be rotated about the z-axis in order to make the fore and aft plane faces square with the origin. This can be helpful for a face split operation. In some embodiments, though not in all, an area around the sensor is then patched via insertion of artificial points. Since, in some embodiments, the sensor may be at the apex of the upper gangway, and cannot detect points above or immediately around itself, there may be sizable gap at the top of the scan. In an embodiment, to improve on the PSR in this area of the cell where the sensor cannot detect points, some points may be added to close off the top of the cell in the estimated volume. In some embodiments, the computing device may be programmed to add the missing volume representing the volume that would be estimated if the points above or immediately around the sensor were detected, towards the end of the pipeline using a preset value representing an unscanned volume. The preset value will be an accurate measure of the missing volume for the majority of the time since lifting gas rises to the top of a gas cell, causing this portion of the gas cell to remain full longer than the rest of the gas cell. The preset value may be determined using a CAD image of the gas cell, assuming perfect rigidity and fullness for this space.

In this or other embodiments, after Step 502, a computing device may be programmed to use a simple Euclidean distance filter to remove points if they lie too far from the origin. In some embodiments, this may not be necessary where points outside of the cell are not detected.

Figure 7:
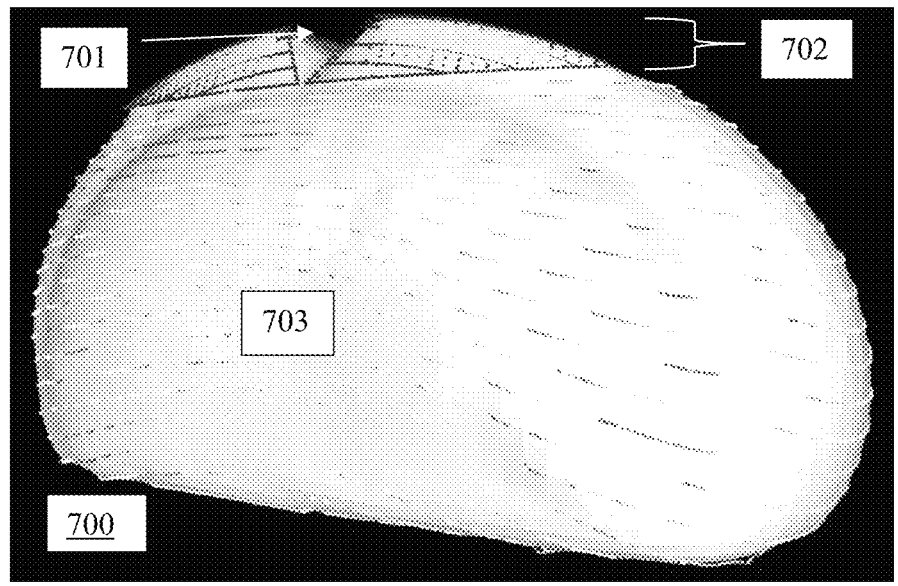
FIG. 7 illustrates a visualization of a Poisson mesh on top of point cloud data from a front view.

FIG. 7 illustrates a visualization of a PSR mesh on top of point cloud data from a front view. A sensor may be placed in a top location 701 over the center of a gas cell 700. A top portion 702 may represent a portion of the gas cell 700 which is out of range of a sensor. A mesh surface 703 may be created by layering a PSR mesh on top of a point cloud.

Figure 8:
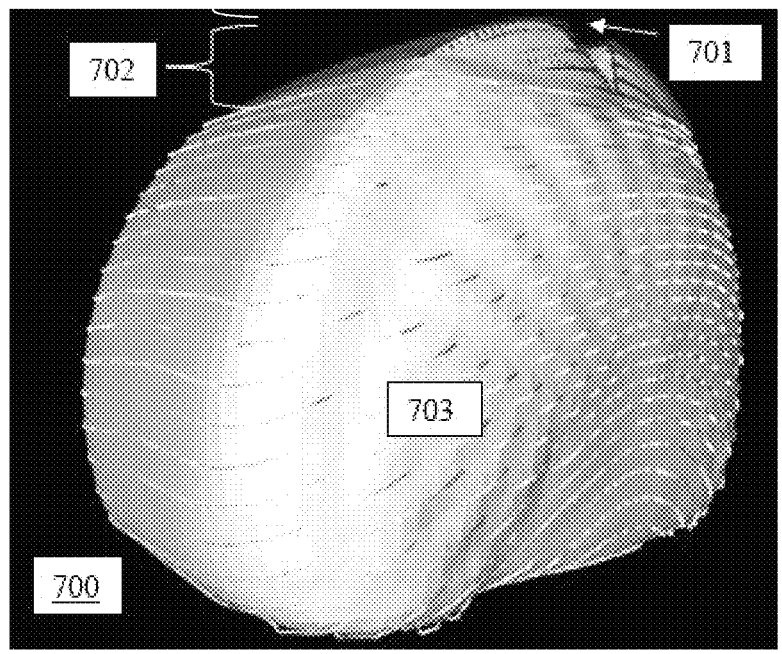
FIG. 8 illustrates a visualization of an isometric view of a gas cell after performing Poisson Surface Reconstruction on top of a point cloud.

FIG. 8 illustrates a visualization of an isometric view of a gas cell 700 after performing Poisson Surface Reconstruction on top of a point cloud. Like in FIG. 7, a sensor may be placed at a top location 701, and a top portion 702 may represent a portion of the gas cell which is out of range of the sensor. A mesh surface 703 may be made up of a PSR mesh layered on top of a point cloud made up, in some embodiments, of tens of thousands of points gathered using the sensor.

FIG. 7 and FIG. 8 illustrate why, in some embodiments, a lidar sensor is placed at a top location 701 of a gas cell 700. Doing so allows for a single lidar sensor to be used without affecting the accuracy of volume measurements. When a gas cell is full, a CAD model of the gas cell 700 will provide a largely accurate representation of the volume of the gas within the gas cell 700. As the gas cell deflates for various reasons, the CAD model is no longer a sufficient substitute for actual measurements to determine the volume of the gas cell 700. However, as gas rises, the top portion of the cell will remain full and the CAD model will remain a sufficient substitute for actual measurements for that portion of the gas cell 700. Thus, a computing device may be programmed to calculate the volume for the rest of the cell 700 using the mesh surface 703, and add in the pre-computed volume of this final unscanned portion, which is represented as the top portion 702. Lidar can be relied on for all but the top portion 702 of the cell, but the lidar measurements are limited by the lidar's field of view which will prevent it from measuring some areas, most often the top portion 702, of the gas cell 700. By placing the lidar upside-down on the ceiling of the cell or just outside of the top, it might not be able to measure the top portion 702 of the cell 700. Alternatively or in addition to this, multiple sensors may be used at various parts of the gas cell, each sending measurements to the computing device, to prevent there being any unscanned portions in the gas cell.

Finally, in some embodiments, in Step 512, a computing device is programmed to execute instructions to calculate a volume of each tetrahedron using the fact that the volume of a tetrahedron is ⅙ the volume of the parallelepiped or ⅙(a×b)·c, where a is the 3D XYZ point describing a first corner of a particular triangle, b is the 3D XYZ point describing a second corner of the same particular triangle, and c is the 3D XYZ point describing a third corner of the same particular triangle. The ordering of these points is arbitrary; no particular point of the triangle needs to be designated as a, b, or c. This is equal to one-sixth of the scalar triple product of the vectors representing any three co-terminal edges of the tetrahedron. This utilizes the triangular nature of a PSR mesh. A triangular pyramid is formed for each individual triangle inside the PSR mesh. This formula is more applicable than a basic equation used to calculate the volume of a pyramid since the coordinates of the triangle's vertices in 3D space are known, thus allowing the "signed volume" of each triangular pyramid to be calculated. Programming a computing device to form a triangular pyramid for each triangle in a PSR mesh allows a simulation to cover every portion of the gas cell with solid positive volumes. Programming the computing device with instructions to add all of these volumes together produces a highly accurate estimate of the total volume of the gas cell.

Volume: Monte Carlo Estimation

Another way to calculate the volume of a gas cell using point values that may be obtained using lidar sensors is through integrals. Monte Carlo (MC) integration uses random sampling to numerically estimate the value of an integral. This is even faster than the mesh method because it allows a computing device to make an accurate estimate of the volume of a gas cell directly from a point cloud, without the need to first make a mesh. This method requires an understanding of the sampling distribution since the lidar cannot provide an infinite number of coordinates. For clarity, the derivation will be performed in the context of a 1D integral, but the method is extendable to higher dimensions, such as for a three-dimensional gas cell. In fact, one of the most prevalent uses of MC integration is to evaluate high dimensional integrals where quadrature rules are infeasible. In this case, the measurements of the surface of a gas cell are obtained using the lidar sensor setup, and the computer is programmed to compute the volume of the cell. This works because the setup of the lidar system provides for a uniform distribution of the data points.

Algorithm for Monte Carlo Estimation

Monte Carlo integration is a simple to use and fast to compute method for numerically estimating the value of an integral. For a prototypical case, consider an arbitrary function $f(x)$ defined on a domain $\Omega \subset R$, signifying that the program is operating in 1D, with $\Omega$ being the domain the computer is working in and R signifying that this is one dimensional. One may wish to evaluate:

$$A = \int_\Omega f(x) dx \tag{1}$$

This is equivalent to $$A = \int_\Omega \frac{f(x)}{\rho(x)} \rho(x) dx \qquad (2)$$

If ρ(x) is a probability density function (pdf), describing the probability that a y exists at a given x, then the integral can be recognized as an expectation, which is essentially the mean for continuous random variables. Ordinarily, pdf must be found or defined, but with a uniform distribution, this simplifies to 1. In shorthand, $E_{x\sim\rho(x)}[f(x)]$ is read as "the expected value of $f(x)$ where x is distributed by ρ(x)." In this notation, (2) can be written:

$$A = E_{x\sim\rho(x)}[f(x)] \qquad (3)$$

Thinking of the expectation as the generalization of arithmetic mean for continuous random variables, it is possible to approximate the expectation as the sample mean. That is, $$A_N := \frac{1}{N} \sum_{i=1}^{N} \frac{f(x_i)}{\rho(x_i)} \qquad (4)$$

where $x_i$ are samples from the distribution defined by ρ(x). This is the definition of the Monte Carlo estimate of (3).

It can be shown that $$\lim_{N\to\infty} A_N = A$$

with an error proportional to $$\frac{1}{\sqrt{N}}.$$

The convergence rate demonstrates that more samples implies better estimate of the integral. Thus, the high number of samples that can be obtained through the lidar detection is one reason this method can be used to estimate the volume of a gas cell with a much higher degree of accuracy than that provided by previous methods.

Sampling

This method requires an understanding of the sampling distribution of the coordinates. Notice in (4) that a program needs to be able to evaluate the pdf at each sample point $x_i$, which implies that the probability distribution that the samples come from is an important factor. If this is not handled correctly, then the resulting estimate will be wrong, potentially very wrong. Such an error can be difficult to detect since the method will still converge with an incorrect probability distribution, just to the wrong value. Therefore, it is of utmost importance that care is taken to understand the distribution used to generate samples, an important consideration when designing the algorithm to ensure that it inherently uses data with good probability distributions. The sampling method also gives a hint at what might be a good coordinate frame in which to compute the estimate, an important consideration when designing the algorithm. For example, measuring data in a spherical coordinate space is best given the scanning characteristics of lidars; by using spherical coordinates, the computing device naturally receives data from an easy to work with probability distribution. The volume integrals for a couple coordinate systems useful for measuring the volume of a gas cell are presented below.

It should also be noted that the MC estimate converges for any pdf, but sometimes certain choices converge faster than others. Recall that the error is proportional to $$\frac{1}{\sqrt{N}}.$$

Different choices of pdf change the proportionality constant.

In some embodiments, normalization is then used to improve the accuracy of the probability density function. It is often the case that ρ(x) is not a true probability density function. A probability density function on a domain is simply a non-negative function that satisfies $$\int_\Omega \rho(x) dx = 1$$

where the equation is the integral of the probability density function, ρ(x) representing the probability density function or how likely a point is to exist at a particular location, Ω representing an example domain, such as 1D, 2D, 3D, etc.

Take for example the simplest case where $$\rho(x) = \begin{cases} 1 & \text{if } x \in \Omega \\ 0 & \text{otherwise} \end{cases}$$

This function is often used to describe a uniform probability distribution on the domain Ω. However, to make ρ(x) a proper pdf, a system must normalize. Let $\grave{\rho}(x)$ be the normalized pdf defined by ρ(x).

$$\grave{\rho}(x) = \frac{\rho(x)}{C} \text{ where } C := \int_\Omega \rho(x) dx$$

In the case of a uniform distribution, such as is obtained using the lidar sensor setup in this method, C is the volume of the domain (b−a in 1D for Ω=(a, b)). Then (2) can be rewritten (2) as $$\int_\Omega C \frac{f(x)}{\rho(x)} \grave{\rho}(x) dx$$

and the corresponding MC estimate can be reframed as $$\frac{C}{N} \sum_{i=1}^{N} \frac{f(x_i)}{\rho(x_i)} \qquad (5)$$

This normalization is necessary because the expectation is defined with respect to a pdf. The expectation is of no use when it is defined with respect to an arbitrary function. This allows us to use a form of the pdf that is convenient for evaluating $\rho(x_i)$, as seen with the example of a uniform distribution (i.e. $\rho(x_i)=1$).

Volume: Monte Carlo Method

A center section of a gas cell which is partially full may be represented as a cutoff cylinder when cylindrical coordinates are used.

Figure 9:
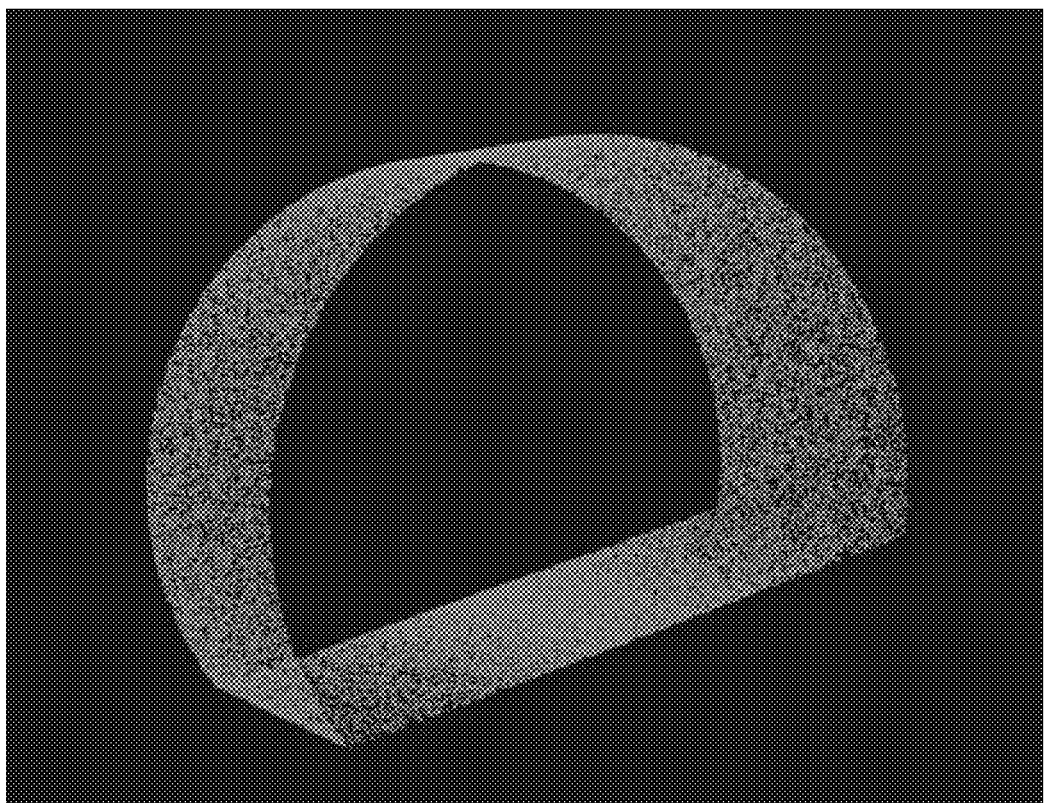
FIG. 9 illustrates a partially full center gas cell which looks like a cutoff cylinder.
Figure 10:
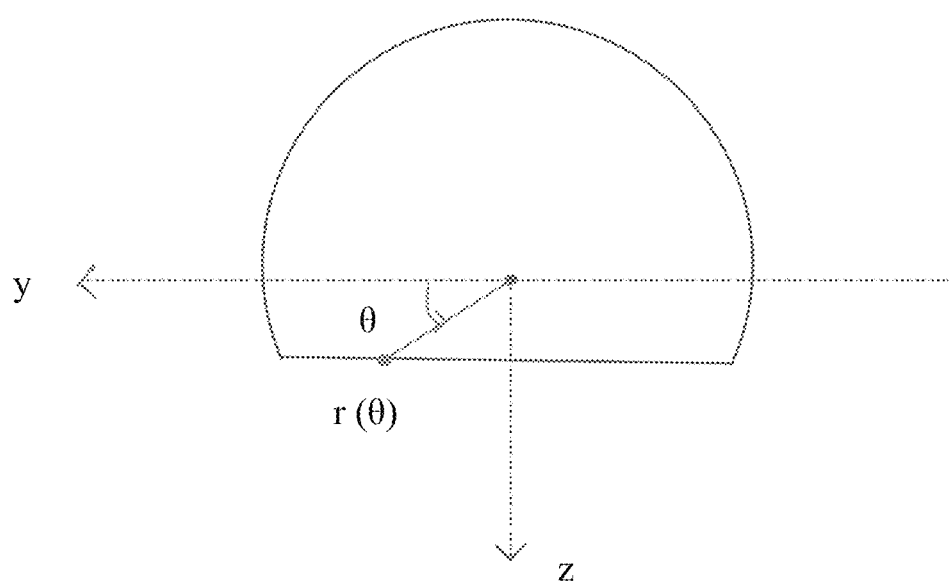
FIG. 10 illustrates a projection of centered cylindrical coordinates on y-z plane.

It is possible, then, to integrate over the domain in cylindrical coordinates to obtain the volume of a cross-section of the gas cell. FIG. 9 illustrates a partially full center gas cell which looks like a cutoff cylinder. The volume in centered cylindrical coordinates, such as in FIG. 10 is given by $$V = \frac{1}{2}\int_0^W \int_0^{2\pi} r^2 d\theta dx$$

where W is the width of the cell along the x-axis. Assuming uniform sampling in $\theta$ and x, the MC estimate for this is $$V \approx V_N = \frac{\pi}{N}\sum_{i=1}^N r_i^2$$

where $r_i$ is the radius computed from the coordinates of the $i^{th}$ sample. FIG. 10 illustrates a projection of centered cylindrical coordinates on y-z plane. Notice here that we do not include samples from the boundary in the x-direction. This is because the volume of the boundary (a plane) is 0 (formally, a plane is a set of measure 0 when embedded in 3D space).

Figure 11:
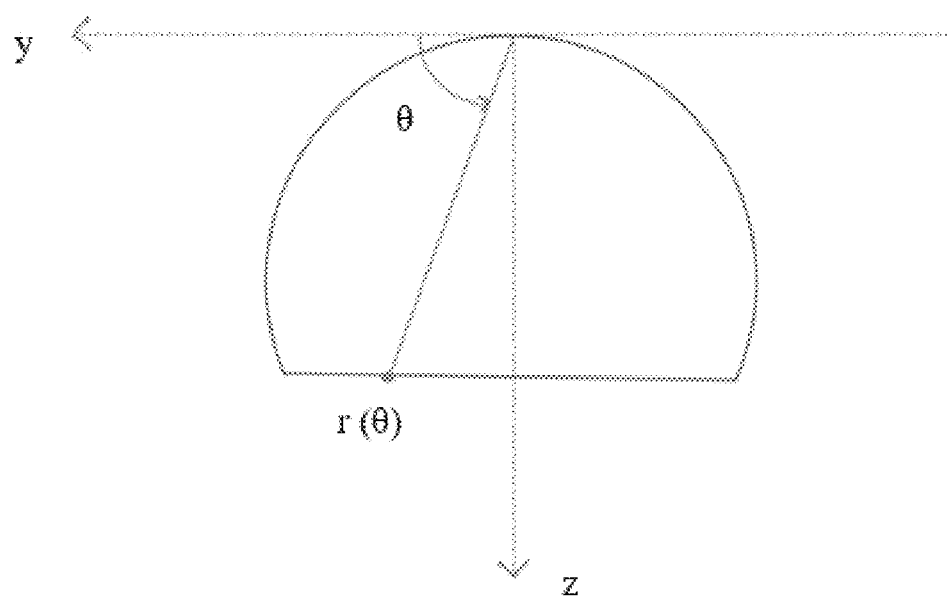
FIG. 11 illustrates a projection of uncentered cylindrical coordinates on y-z plane.

FIG. 11 illustrates a projection of uncentered cylindrical coordinates on y-z plane. In uncentered cylindrical coordinates where the origin is at the top of the cell, the angle only sweeps from 0 to $\pi$. Still assuming uniform sampling in these coordinates, the MC estimate is $$V \approx V_N = \frac{\pi}{2N}\sum_{i=1}^N r_i^2$$

Note that these $r_i$s are with respect to the x-y plane located at the top of the cell.

In some embodiments, spherical coordinates can be used, such as might be obtained using a lidar sensor. Spherical coordinates can be defined in a similar fashion to cylindrical coordinates, with the origin either centered in the cell or located at the top of the cell (centered in x though). Define the spherical coordinates with $\phi$ as the angle from the positive z-axis (rotating around x) and $\theta$ as the angle from the positive y-axis (rotating around z). In centered spherical coordinates, the volume is given by $$V = \frac{1}{3}\int_0^{2\pi}\int_{-\pi/2}^{\pi/2} r^3 \sin\phi d\phi d\theta$$

where r is the radius, the straight line distance from the lidar to the sample point on the cell, $\phi$ is the angle between the z-axis and the x-y plane, and $\theta$ is the angle that lies in the x-y plane. All of this information may be given to the system by the lidar. Instead of using it directly in this method, the Monte Carlo method may be used to estimate the formula, given immediately below. A few variations on the formula are given in this section such as the cylindrical, centered cylindrical, and centered spherical.

Assuming uniform sampling in both $\phi$ and $\theta$, the MC estimate for centered spherical coordinates is $$V \approx V_N = \frac{2\pi^2}{3N}\sum_{i=1}^N r_i^3 \sin\phi_i$$

and $$V \approx V_N = \frac{\pi^2}{3N}\sum_{i=1}^N r_i^3 \sin\phi_i$$

for uncentered spherical coordinates as when the origin is at the top of the cell, as in an embodiment where the sensor is placed at the top center of the cell.

As mentioned in elsewhere in this specification it is extremely important to get the sampling density correct. The above equations all assume uniform sampling in their corresponding variables. If this assumption is not correct, then new formulas must be developed with the appropriate density. Furthermore, changing coordinates requires change of variables for the sampling density. For example, the current lidar system samples uniformly in spherical coordinates with the origin at the lidar (top of the cell). If one naively changes coordinates to cylindrical coordinates because it is more natural for a cylinder section, the formulas given above for cylindrical coordinates will yield the incorrect result. For the present case of volume estimation via radial measurements obtained using the described lidar system, spherical coordinates centered at the top of the cell are utilized since the data is naturally generated uniformly in this coordinate system. This ability to provide an algorithm that uses the Monte Carlo method a uniform sampling distribution in spherical coordinates is one reason it is so valuable to place the lidar in the center of the cell. No coordinate transformation is needed.

Center of Buoyancy

In an embodiment, before or after a computing device has received or determined the volume of a gas cell, it may execute programmed instructions to calculate a center of buoyancy. This may be done alternatively or in addition to a lift measurement and may use coordinates gathered using the same lidar setup used to calculate volume. The center of buoyancy is the point on which lift acts and thus is helpful for a flight controller to know. It is in the geometric center of the cell. In the case of gas cells used in airships, the center of buoyancy is by definition also equivalent to a center of gravity of the air displaced by the cell. The computing device may be programmed to use one of two methods to calculate this center of buoyancy.

One method is using a point cloud. In an embodiment, assuming constant point density throughout a gas cell, the center of gravity can be calculated by averaging the x, y, and z coordinates. For each plane, all the coordinates may be added together and then each of those sums may be divided by the number of points to get the average xyz coordinate in the cloud. This is the centroid, again, assuming constant point density.

Another method of calculating center of buoyancy is using standard centroid equations, assuming a constant density. The mass of a 3D shape is given by following formula:

$$m = \iiint \rho(x,y,z) dx dy dz.$$

where ρ(x,y,z) is the density function of the solid, and moment is equal to force times distance, allowing us to calculate the x, y, and x moments:

$$M_{xy} = \int z\rho(x, y, z)dxdydz,$$

$$M_{yz} = \int x\rho(x, y, z)dxdydz, \; M_{xz} = \int y\rho(x, y, z)dxdydz$$

$$\bar{x} = \frac{\iiint x\rho(x, y, z)dxdydz}{\iiint \rho(x, y, z)dxdydz} \; \bar{y} =$$

$$\frac{\iiint y\rho(x, y, z)dxdydz}{\iiint \rho(x, y, z)dxdydz} \; \bar{z} = \frac{\iiint z\rho(x, y, z)dxdydz}{\iiint \rho(x, y, z)dxdydz}$$

Assuming the solid is homogenous throughout, then by definition ρ(x,y,z)=1. This means the solid is made of the same material throughout, such as a solid ion sphere. In our case, this assumption can be made since the gas cell is mostly helium. If we divide moment by mass, as seen above, the result is the centroid of the shape of the gas cell along each coordinate.

Lift

Lift is tied to a density of a lifting gas inside a gas cell. Density is equal to mass divided by volume. In an airship, this density may be for helium inside each gas cell. This density follows the ideal gas law:

PV=nRT or
Pressure*Volume=moles*Constant*Temperature

As an airship moves between altitudes, atmospheric pressure and temperature change, and the helium responds to maintain pressure equilibrium. This can cause a change in the density ratio between the helium and the atmosphere, which leads to a change in lift. This change in lift will remain until temperature equilibrium is regained. Additionally, this change in lift introduces an unknown during flight. This disclosure remedies this unknown by putting a system in place that uses a sensor and a computing device to measure the volume of the cell in real time to provide the amount of lift that the cell has at a given instance to a flight computer.

In an embodiment, a computing device may be programmed to execute a calculation for finding lift of a gas cell or of an entire airship after receiving or calculating the measure of volume in each gas cell. Helium, one of the most common lifting gases, has an average unit lift of 0.0659 lbs/ft$^3$ of weight under atmospheric conditions. The computing device may be programmed to calculate unit lift by subtracting the weight of a cubic foot of helium from the weight of a cubic foot of air. To get the lifting force of the helium in a cell, the computing device may be programmed to use the following equation:

Absolute Lift=Volume*Unit Lift

In an embodiment, a computing device may be programmed to use the assumption that the cell is pure helium. The instructions may additionally include multiplying the absolute lift by a scaling factor to account for the potential impurity of helium in the cell. For example, in some embodiments, the scaling factor may be 0.98, representing the assumption or knowledge that the cell contains 98% helium and 2% air. This scaling factor may be input before flight or adjusted during flight.

Figure 12:
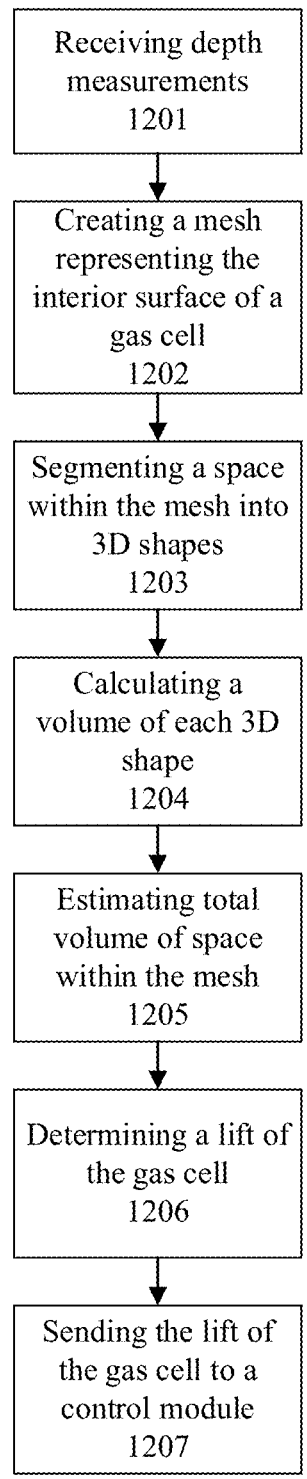
FIG. 12 illustrates a flow diagram of one embodiment of the claimed method.

FIG. 12 illustrates a flow diagram of one embodiment of the claimed method. At Step 1201, a computing device receives depth measurements for a gas cell, such as those that may be obtained using a lidar sensor. At Step 1202, the computing device creates a mesh representing the interior of a gas cell using the depth coordinates. At Step 1203, the computing device segments a space within the mesh into a plurality of three-dimensional shapes before, at Step 1204, calculating the volume of each of the plurality of three-dimensional shapes. Then, at Step 1205, the computing device estimates the total volume of space within the total mesh by summing the volumes for each of the plurality of three-dimensional shapes. At Step 1206, the computing device determines a lift of the gas cell using the estimated total volume of the gas in the cell. Finally, at Step 1207, the computing device sends the lift calculated for the gas cell to a control module.

Figure 13:
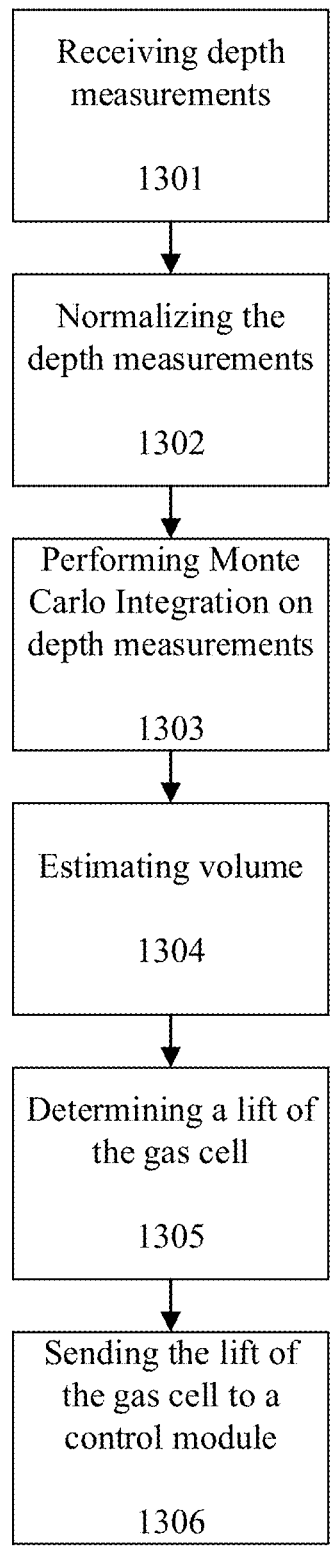
FIG. 13 illustrates a flow diagram of one embodiment of the claimed method.

FIG. 13 illustrates a flow diagram of one embodiment of the claimed method. At Step 1301, a computing device receives depth measurements for a gas cell, such as those that may be obtained using a lidar sensor. At Step 1302, the computing device runs a program that normalizes the depth measurements. At Step 1303, the computing device runs the program or another program that performs Monte Carlo integration on the depth measurements. At Step 1304, the computing device estimates the volume of the gas cell. At Step 1305, the computing device determines a lift of the gas cell using the estimated volume of the gas cell. Finally, at Step 1306, the computing device sends the lift calculated for the gas cell to a control module.

Further Actions

In some embodiments, a computing device is programmed to perform actions in response to obtaining lift and/or center of buoyancy values. It may, for example, be programmed to send lift and/or center of buoyancy values to a control module. The values may be displayed to a pilot or flight controller. Alternatively, or in addition to this display, the computing device may be programmed to signal an alert to the control module and/or perform actions directly related to the control of the airship when the values are above or below a pre-set threshold. For example, if the lift falls below a pre-set threshold, a computing device may execute instructions to engage propellers, adjust rudders, or execute further instructions involved with landing the airship.

Hardware Overview

Figure 14:
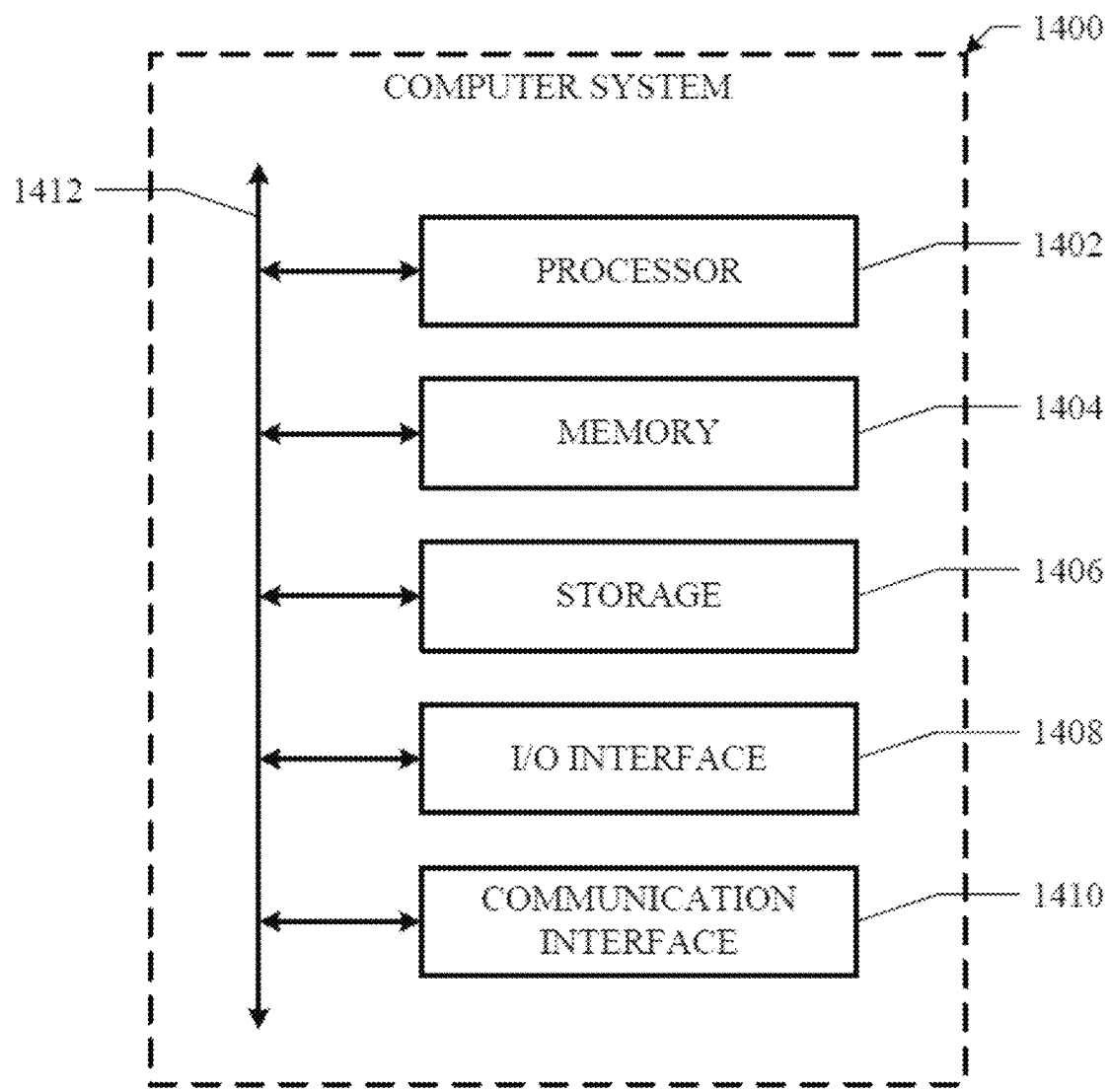
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for determining a current state of a gas cell of an airship, comprising:
receiving, by a computing device of the airship, depth measurements of an interior surface of the gas cell of the airship, the gas cell comprising a lifting gas, the depth measurements being measured by a lidar sensor positioned outside at the top of the gas cell comprising the lifting gas and pointing toward the interior surface of the gas cell through a transparent window of the gas cell;
creating, by the computing device, a three-dimensional mesh representing the interior surface of the gas cell based on the depth measurements;

segmenting, by the computing device, a space within the three-dimensional mesh into a plurality of three-dimensional geometric shapes;

calculating, by the computing device, a volume of each of the plurality of three-dimensional geometric shapes;

estimating, by the computing device, a total volume of the space within the three-dimensional mesh based on the volume of each of the plurality of three-dimensional geometric shapes;

determining, by the computing device, a lift of the gas cell comprising the lifting gas based on the total volume of the space within the three-dimensional mesh; and sending, by the computing device, the lift of the gas cell comprising the lifting gas to a control module of the airship.

2. The method of claim 1, wherein the gas cell is one of a plurality of gas cells in the airship.

3. The method of claim 2, wherein a lift is calculated for each of the plurality of gas cells in the airship.

4. The method of claim 1, wherein the lift of the gas cell is computed based on a lift of the lifting gas in the gas cell, wherein the lifting gas is lighter than air in the atmosphere.

5. The method of claim 1, further comprising displaying the lift on a display of the control module.

6. The method of claim 1, further comprising signaling an alert to the control module when the lift of the gas cell has fallen below a predetermined threshold.

7. The method of claim 1, further comprising calculating a center of buoyancy for the gas cell and sending the center of buoyancy to the control module of the airship.

8. The method of claim 1, further comprising calculating a static lift of the gas cell by multiplying the total volume of the space within the three-dimensional mesh by a unit lift of the lifting gas inside the gas cell.

9. The method of claim 1, further comprising a second lidar sensor being placed at a second location on the gas cell, wherein the second lidar sensor generates depth measurements and sends them to the computing device to create the three-dimensional mesh.

10. The method of claim 1, further comprising adding an unscanned volume to the total volume of the space within the three-dimensional mesh, wherein the unscanned volume represents a volume of the gas cell that is not in range of the lidar sensor and is assumed to be at a full volume and is calculated from a computer aided design (CAD) model of the gas cell.

11. The method of claim 1, wherein the lifting gas in the gas cell is helium.

12. A system for dynamically determining the volume of a gas cell of an airship, comprising:

at least one onboard computing device, the at least one onboarding computing device being connected to a lidar senor, the lidar sensor being positioned on a window on an outside of the gas cell;

at least one memory device for storing machine readable instructions, the machine readable instructions, when executed performing the steps of:

receiving, by the computing device of the airship, depth measurements of an interior surface of the gas cell of the airship, the gas cell comprising a lifting gas, the depth measurements being measured by the lidar sensor positioned outside at the top of the gas cell comprising the lifting gas and pointing toward the interior surface of the gas cell through a transparent window of the gas cell;

creating, by the computing device, a three-dimensional mesh representing the interior surface of the gas cell based on the depth measurements;

segmenting, by the computing device, a space within the three-dimensional mesh into a plurality of three-dimensional geometric shapes;

calculating, by the computing device, a volume of each of the plurality of three-dimensional geometric shapes;

estimating, by the computing device, a total volume of the space within the three-dimensional mesh based on the volume of each of the plurality of three-dimensional geometric shapes;

determining, by the computing device, a lift of the gas cell comprising the lifting gas based on the total volume of the space within the three-dimensional mesh; and sending, by the computing device, the lift of the gas cell comprising the lifting gas to a control module of the airship.

13. The system of claim 12, wherein the gas cell is one of a plurality of gas cells in the airship.

14. The system of claim 13, wherein a lift is calculated for each of the plurality of gas cells in the airship.

15. The system of claim 12, wherein the lift of the gas cell is computed based on a lift of the lifting gas in the gas cell, wherein the lifting gas is lighter than air in the atmosphere.

16. The system of claim 12, further comprising displaying the lift on a display of the control module.

17. The system of claim 12, further comprising signaling an alert to the control module when the lift of the gas cell has fallen below a predetermined threshold.

18. The system of claim 12, further comprising calculating a center of buoyancy for the gas cell and sending the center of buoyancy to the control module of the airship.

19. The system of claim 12, further comprising calculating a static lift of the gas cell by multiplying the total volume of the space within the three-dimensional mesh by a unit lift of the lifting gas inside the gas cell.

20. The system of claim 12, further comprising a second lidar sensor being placed at a second location on the gas cell, wherein the second lidar sensor generates depth measurements and sends them to the computing device to create the three-dimensional mesh.

* * * * *